US010082589B2

(12) United States Patent
Hauan et al.

(10) Patent No.: US 10,082,589 B2
(45) Date of Patent: Sep. 25, 2018

(54) METHOD TO DETERMINE THE DEVIATION OF SEISMIC EQUIPMENT FROM A PLANNED CURVED PATH

(71) Applicant: WesternGeco L.L.C., Houston, TX (US)

(72) Inventors: Johan Hauan, Oslo (NO); Rune Hagelund, Dokka (NO); Stig Solheim, Østerås (NO)

(73) Assignee: WesternGeco L.L.C., Houston, TX (US)

(*) Notice: Subject to any disclaimer, the term of this patent is extended or adjusted under 35 U.S.C. 154(b) by 471 days.

(21) Appl. No.: 14/714,838

(22) Filed: May 18, 2015

(65) Prior Publication Data

US 2015/0253446 A1 Sep. 10, 2015

Related U.S. Application Data

(63) Continuation of application No. 12/468,477, filed on May 19, 2009, now Pat. No. 9,052,411.
(Continued)

(51) Int. Cl.
G01V 1/38 (2006.01)
G01V 1/30 (2006.01)
G01V 1/34 (2006.01)

(52) U.S. Cl.
CPC ............. *G01V 1/3835* (2013.01); *G01V 1/30* (2013.01); *G01V 1/345* (2013.01);
(Continued)

(58) Field of Classification Search
CPC combination set(s) only.
See application file for complete search history.

(56) References Cited

U.S. PATENT DOCUMENTS 2,404,440 A 7/1946 Holm
2,465,696 A 3/1949 Pasley
(Continued)

FOREIGN PATENT DOCUMENTS

EP 0 018053 A1 10/1980
EP 0 018053 B1 12/1983
(Continued)

OTHER PUBLICATIONS

PCT Search Report and Written Opinion; PCT/US2010/062419; dated Sep. 26, 2011.
(Continued)

*Primary Examiner* — Mamadou Diallo
(74) *Attorney, Agent, or Firm* — Kevin Brayton McGoff

(57) ABSTRACT

A group of techniques can be used to determine if components of a seismic spread have deviated from a planned path during a coil or other curved and substantially circular acquisition pattern. In one aspect, and in general, the presently disclosed techniques include a computer-readable program storage medium for determining the deviation of spread array element from a planned curved path during a towed-array marine seismic survey. The method comprises: determining a nominal position of the spread array element at a given point in the planned curved path; determining the actual position of the spread array element; and performing an error analysis predicated on the nominal and actual positions.

21 Claims, 4 Drawing Sheets

Related U.S. Application Data

(60) Provisional application No. 61/061,330, filed on Jun. 13, 2008.

(52) U.S. Cl.
CPC .... *G01V 2210/165* (2013.01); *G01V 2210/60* (2013.01); *G01V 2210/74* (2013.01)

(56) References Cited

U.S. PATENT DOCUMENTS

| | | |
|---|---|---|
| 2,693,862 A | 11/1954 | Reiber |
| 2,823,375 A | 2/1958 | Camp |
| 3,283,293 A | 11/1966 | Pavey et al. |
| 3,331,050 A | 7/1967 | Kilmer et al. |
| 3,440,992 A | 4/1969 | Chance |
| 3,505,577 A | 4/1970 | Hirokawa |
| 3,506,674 A | 4/1970 | Berger |
| 3,560,912 A | 2/1971 | Spink et al. |
| 3,581,273 A | 5/1971 | Hedberg |
| 3,605,674 A | 9/1971 | Weese |
| 3,774,570 A | 11/1973 | Pearson |
| 3,806,863 A | 4/1974 | Tilley et al. |
| 3,896,756 A | 7/1975 | Pearson et al. |
| 3,921,124 A | 11/1975 | Payton |
| 3,934,220 A | 1/1976 | Davis |
| 3,953,827 A | 4/1976 | Le Moal et al. |
| 4,033,278 A | 7/1977 | Waters |
| 4,068,208 A | 1/1978 | Rice, Jr. et al. |
| 4,074,648 A | 2/1978 | Reid et al. |
| 4,086,504 A | 4/1978 | Ezell et al. |
| 4,146,870 A | 3/1979 | Ruehle |
| 4,231,111 A | 10/1980 | Neeley |
| 4,290,124 A | 9/1981 | Cole |
| 4,353,121 A | 10/1982 | Ray et al. |
| 4,383,259 A | 5/1983 | Rader |
| 4,404,664 A | 9/1983 | Zachariadis |
| 4,468,663 A | 8/1984 | Kalt |
| 4,486,863 A | 12/1984 | French |
| 4,648,080 A | 3/1987 | Hargreaves |
| 4,657,482 A | 4/1987 | Neal |
| 4,669,067 A | 5/1987 | Roberts |
| 4,669,097 A | 5/1987 | Bristol |
| 4,709,355 A | 11/1987 | Woods et al. |
| 4,729,333 A | 3/1988 | Kirby et al. |
| 4,757,482 A | 7/1988 | Fiske, Jr. |
| 4,803,668 A | 2/1989 | Berryhill et al. |
| 4,834,181 A | 5/1989 | Uhri et al. |
| 4,890,568 A | 1/1990 | Dolengowski |
| 4,912,684 A | 3/1990 | Fowler |
| 4,894,807 A | 6/1990 | Alan et al. |
| 4,942,991 A | 7/1990 | Lyons |
| 4,960,183 A | 10/1990 | Young, II |
| 4,965,773 A | 10/1990 | Marschall |
| 4,970,696 A | 11/1990 | Crews et al. |
| 4,970,697 A | 11/1990 | Earley et al. |
| 4,992,990 A | 2/1991 | Langeland et al. |
| 4,992,991 A | 2/1991 | Young et al. |
| 4,992,992 A | 2/1991 | Dragoset, Jr. |
| 5,031,159 A | 7/1991 | Rouquette |
| 5,128,904 A | 7/1992 | Chambers |
| 5,179,905 A | 1/1993 | Hossfield et al. |
| 5,200,930 A | 4/1993 | Rouquette |
| 5,300,929 A | 4/1994 | MacLeod |
| 5,329,071 A | 7/1994 | Vatne et al. |
| 5,353,223 A | 10/1994 | Norton et al. |
| 5,430,689 A | 7/1995 | Rigsby et al. |
| 5,443,027 A | 8/1995 | Owsley et al. |
| H001490 H | 9/1995 | Thompson et al. |
| 5,508,973 A | 4/1996 | Mallick et al. |
| 5,532,975 A | 7/1996 | Elholm |
| 5,546,882 A | 8/1996 | Kuche |
| 5,555,531 A | 9/1996 | Booth et al. |
| 5,640,325 A | 6/1997 | Banbrook et al. |
| 5,668,775 A | 9/1997 | Hatteland |
| 5,677,893 A | 10/1997 | de Hoop et al. |
| 5,682,357 A | 10/1997 | Rigsby |
| 5,761,152 A | 6/1998 | Jacobsen et al. |
| 5,790,472 A | 8/1998 | Workman et al. |
| 5,973,995 A | 10/1999 | Walker et al. |
| 5,978,316 A | 11/1999 | Ambs et al. |
| 6,011,752 A | 1/2000 | Ambs et al. |
| 6,011,753 A | 1/2000 | Chien |
| 6,028,817 A | 2/2000 | Ambs |
| 6,044,040 A | 3/2000 | Holland |
| 6,061,301 A | 5/2000 | Corrigan |
| 6,144,342 A | 11/2000 | Bertheas et al. |
| 6,175,809 B1 | 1/2001 | Naville |
| 6,178,381 B1 | 1/2001 | Padhi et al. |
| 6,285,956 B1 | 9/2001 | Bennett et al. |
| 6,292,754 B1 | 9/2001 | Thomsen |
| 6,343,256 B1 | 1/2002 | Winbow et al. |
| 6,418,378 B1 | 7/2002 | Nyland |
| 6,477,111 B1 | 11/2002 | Lunde et al. |
| 6,477,711 B1 | 11/2002 | Freeman et al. |
| 6,493,636 B1 | 12/2002 | DeKok |
| 6,525,992 B1 | 2/2003 | Olivier et al. |
| 6,529,832 B1 | 3/2003 | Kerekes |
| 6,553,315 B2 | 4/2003 | Kerekes et al. |
| 6,590,831 B1 | 7/2003 | Bennett et al. |
| 6,629,037 B1 | 9/2003 | Nyland |
| 6,671,223 B2 | 12/2003 | Bittleston |
| 6,684,160 B1 | 1/2004 | Ozbek et al. |
| 6,691,038 B2 | 2/2004 | Zajac |
| 6,714,873 B2 | 3/2004 | Bakulin et al. |
| 6,837,175 B1 | 1/2005 | Gieseke |
| 6,847,896 B1 | 1/2005 | Orban et al. |
| 6,862,531 B2 | 3/2005 | Horne et al. |
| 6,865,487 B2 | 3/2005 | Charron |
| 6,932,017 B1 | 8/2005 | Hillesund et al. |
| 6,944,094 B1 | 9/2005 | Thomsen et al. |
| 7,065,449 B2 | 6/2006 | Brewster et al. |
| 7,080,607 B2 | 7/2006 | Hillesund et al. |
| 7,203,130 B1 | 4/2007 | Welker |
| 7,239,577 B2 | 7/2007 | Tenghamn et al. |
| 7,293,520 B2 | 11/2007 | Hillesund et al. |
| 7,377,224 B2 | 5/2008 | Ryan et al. |
| 7,391,673 B2 | 6/2008 | Regone et al. |
| 7,400,552 B2 | 7/2008 | Moldoveanu et al. |
| 7,403,448 B2 | 7/2008 | Welker et al. |
| 7,616,522 B2 | 11/2009 | Rouquette |
| 7,660,189 B2 | 2/2010 | Vigen et al. |
| 7,679,990 B2 | 3/2010 | Herkenhoff et al. |
| 7,952,522 B2 | 5/2011 | Hohl |
| 7,965,583 B2 | 6/2011 | Thomas |
| 8,004,930 B2 | 8/2011 | Welker et al. |
| 8,559,265 B2 * | 10/2013 | Moldoveanu ........ G01V 1/3808 367/15 |
| 8,681,580 B2 | 3/2014 | Moldoveanu et al. |
| 8,681,581 B2 | 3/2014 | Moldoveanu et al. |
| 9,103,942 B2 | 8/2015 | Moldoveanu et al. |
| 9,594,181 B2 | 3/2017 | Solheim et al. |
| 9,703,000 B2 | 7/2017 | Moldoveanu et al. |
| 9,766,359 B2 | 9/2017 | Moldoveanu et al. |
| 9,857,491 B2 | 1/2018 | Moldoveanu et al. |
| 9,869,787 B2 | 1/2018 | Moldoveanu et al. |
| 2002/0193947 A1 | 12/2002 | Chamberlain |
| 2003/0067842 A1 | 4/2003 | Sukup et al. |
| 2003/0125878 A1 | 7/2003 | Bakulin et al. |
| 2003/0208320 A1 | 11/2003 | Zajac |
| 2004/0004907 A1 | 1/2004 | Austad et al. |
| 2004/0042341 A1 | 3/2004 | Tenghamn et al. |
| 2004/0066707 A1 | 4/2004 | Tenghamn et al. |
| 2004/0125697 A1 | 7/2004 | Fleming |
| 2004/0240319 A1 | 12/2004 | Carvill et al. |
| 2005/0018537 A1 | 1/2005 | Welker et al. |
| 2005/0180260 A1 | 8/2005 | Planke et al. |
| 2005/0180263 A1 | 8/2005 | Lambert et al. |
| 2005/0194201 A1 | 9/2005 | Tenghamn et al. |
| 2006/0155476 A1 | 7/2006 | Abma |
| 2006/0155477 A1 | 7/2006 | Matson et al. |
| 2006/0215489 A1 | 9/2006 | Solheim et al. |
| 2006/0227657 A1 | 10/2006 | Tveide et al. |
| 2006/0239117 A1 | 10/2006 | Singh et al. |
| 2006/0256653 A1 | 11/2006 | Toennessen et al. |

(56) References Cited

U.S. PATENT DOCUMENTS

| | | |
|---|---|---|
| 2006/0256654 A1 | 11/2006 | Paulsen |
| 2006/0285435 A1 | 12/2006 | Robertsson |
| 2007/0064526 A1 | 3/2007 | Holo |
| 2007/0104028 A1 | 5/2007 | Van Manen et al. |
| 2007/0115757 A1 | 5/2007 | Soerli et al. |
| 2007/0127312 A1 | 6/2007 | Storteig et al. |
| 2007/0159921 A1 | 7/2007 | Regone et al. |
| 2007/0165486 A1 | 7/2007 | Moldoveanu et al. |
| 2007/0274153 A1 | 11/2007 | Bisley et al. |
| 2007/0294036 A1 | 12/2007 | Strack et al. |
| 2008/0008032 A1 | 1/2008 | Welker |
| 2008/0008037 A1 | 1/2008 | Welker |
| 2008/0238975 A1 | 10/2008 | Kawai |
| 2008/0239875 A1 | 10/2008 | Alumbaugh et al. |
| 2008/0253225 A1 | 10/2008 | Welker et al. |
| 2008/0267010 A1 | 10/2008 | Moldoveau et al. |
| 2008/0285380 A1 | 11/2008 | Rouquette |
| 2008/0285381 A1 | 11/2008 | Moldoveanu et al. |
| 2009/0122640 A1 | 5/2009 | Hill et al. |
| 2009/0141587 A1 | 6/2009 | Welker et al. |
| 2009/0231953 A1 | 9/2009 | Welker et al. |
| 2009/0245019 A1 | 10/2009 | Falkenberg et al. |
| 2009/0262601 A1 | 10/2009 | Hillesund et al. |
| 2009/0296518 A1 | 12/2009 | MacNeill et al. |
| 2009/0310439 A1* | 12/2009 | Hauan ............... G01V 1/3835 367/21 |
| 2009/0310440 A1* | 12/2009 | Solheim ............ G01V 1/3808 367/21 |
| 2009/0316525 A1 | 12/2009 | Welker |
| 2010/0013485 A1 | 1/2010 | Alumbaugh et al. |
| 2010/0027374 A1 | 2/2010 | Moldoveanu et al. |
| 2010/0118645 A1 | 5/2010 | Welker et al. |
| 2010/0142317 A1 | 6/2010 | Moldoveanu et al. |
| 2010/0238762 A1 | 9/2010 | Hornbostel |
| 2011/0158041 A1 | 6/2011 | Moldoveanu et al. |
| 2011/0158042 A1 | 6/2011 | Moldoveanu et al. |
| 2011/0260730 A1 | 10/2011 | Sudow et al. |
| 2011/0305109 A1 | 12/2011 | Soubaras |
| 2012/0092956 A1 | 4/2012 | Soubaras |
| 2012/0134234 A1 | 5/2012 | Roberts et al. |
| 2012/0213033 A1 | 8/2012 | Soubaras |
| 2013/0242695 A1 | 9/2013 | Soubaras |
| 2013/0301384 A1 | 11/2013 | Hill et al. |
| 2014/0204709 A1 | 7/2014 | Moldoveanu et al. |
| 2014/0321237 A1 | 10/2014 | Moldoveanu et al. |
| 2015/0253446 A1 | 9/2015 | Hauan et al. |
| 2015/0260868 A1 | 9/2015 | Moldoveanu et al. |

FOREIGN PATENT DOCUMENTS

| | | |
|---|---|---|
| EP | 0 321705 A2 | 6/1989 |
| EP | 0 347019 A2 | 12/1989 |
| EP | 0 562781 A2 | 9/1993 |
| EP | 0 613025 A1 | 8/1994 |
| EP | 0 613025 B1 | 9/1998 |
| EP | 0 681193 B1 | 8/1999 |
| GB | 2093610 A | 9/1982 |
| GB | 2144854 A | 3/1985 |
| GB | 2342081 A | 4/2000 |
| GB | 2390902 A | 1/2004 |
| GB | 2424949 A | 10/2006 |
| GB | 2436206 A | 9/2007 |
| WO | 1984-003153 A1 | 8/1984 |
| WO | 1996-021163 A1 | 7/1996 |
| WO | 1997-011395 A2 | 3/1997 |
| WO | 1997-030361 A1 | 8/1997 |
| WO | 1997-045006 A1 | 12/1997 |
| WO | 1998-028636 A1 | 7/1998 |
| WO | 2000-020895 A1 | 4/2000 |
| WO | 2001-029580 A1 | 4/2001 |
| WO | 2004-092771 A2 | 10/2004 |
| WO | 2005-062075 A1 | 7/2005 |
| WO | 2006-014750 A2 | 2/2006 |
| WO | 2007-070499 A2 | 6/2007 |
| WO | 2008-144492 A2 | 11/2008 |
| WO | 2010-002600 A2 | 1/2010 |
| WO | 2011/086149 A1 | 7/2011 |
| WO | 2011/086166 A1 | 7/2011 |
| WO | 2011/161118 A1 | 12/2011 |
| WO | 2013/019691 A1 | 2/2013 |

OTHER PUBLICATIONS

PCT Search Report and Written Opinion; PCT/US2010/035063; dated Dec. 29, 2010.
PCT Search Report and Written Opinion; PCT/US2009/060864; dated May 1, 2010.
PCT Search Report and Written Opinion; PCT/US2009/063538; dated Apr. 30, 2010.
PCT Search Report and Written Opinion; PCT/US2009/047015; dated Feb. 24, 2010.
PCT Search Report and Written Opinion; PCT/US2009/047019; dated Jan. 7, 2010.
PCT Search Report and Written Opinion; PCT/US2009/045261; dated Dec. 23, 2009.
PCT Search Report and Written Opinion; PCT/US2008/063875; dated Sep. 16, 2009.
UKIPO examination report (dated Aug. 10, 2009) and search report (dated Aug. 7, 2009) for GB 0912870.3.
SIPO Reexamination Notice After Final (dated May 4, 2014); CN 200880021257.8.
EPO Search Report (dated Mar. 25, 2014); EP 2010778189.0.
EPO Office Action (dated Dec. 4, 2013); EP 2008755677.3.
Mexican associate reporting dated Oct. 2013 for IMPI Office Action (dated Jul. 8, 2013); MX/a/2012/007769.
UKIPO Examination Report (dated Oct. 16, 2012); GB 1216841.5.
UKIPO Examination Report (dated Jul. 2, 2012); GB 1019201.1.
PCT Search Report and Written Opinion; PCT/US2009/031396; dated May 14, 2009.
IPAU Examination Report (dated Jun. 21, 2012); AU 2008254856.
SIPO Rejection Decision (dated Jun. 6, 2012) and SIPO Office Actions (dated Feb. 6, 2012 and Jul. 20, 2011); CN 200880021257.8.
Mexican associate reportings dated Jul. 2012, Oct. 2011, and Apr. 2011 for IMPI Office Actions; MX/a/2009/012362.
UKIPO Examination Reports (dated May 18, 2012 and Feb. 13, 2012); GB 1019199.7.
Mexican associate reportings dated Aug. 2012 and Mar. 2012 for IMPI Office Actions; MX/a/2010/013018.
IPAU Examination Report (dated May 16, 2008); AU 2006252148.
SIPO Office Action (dated Nov. 19, 2010); CN 200710003980.0.
UKIPO Examination Reports (dated Jun. 8, 2010, Mar. 17, 2010, Nov. 13, 2009, Aug. 10, 2009, and Feb. 6, 2009) and UKIPO Search Report (dated Jul. 18, 2007); GB 0700970.9.
Mexican associate reporting dated Jun. 2009 for IMPI Office Action; PA/a/2007/000733.
Moldoveanu, et al; Full Azimuth Imaging Using Circular Geometry Acquisition; Leading Edge; vol. 27, No. 7; pp. 908-913; Jul. 2008.
Moldoveanu; "Circular Geometry for Wide-Azimuth Towed-Streamer Acquisition"; EAGE; Jun. 2008.
Hennenfent, et al.; "Simply Denoise: Wavefield Reconstructions via Jittered Undersampling"; Geophysics; vol. 73(2); pp. v19-v28; May-Jun. 2008.
Hennenfent, et al.; "Random Sampling: New Insights into the Reconstruction of Coarsely-Sampled Wavefields"; SEG Annual Meeting; pp. 2575-2579; Oct. 2007.
WesternGeco Q-Technology URL: http://www.westemgeco.com/content/services/q_technology/index.asp—No Longer Exists 2006.
Bacon, et al.; "3-D Seismic Interpretation"; Cambridge University Press; pp. 18-22 and 25-26; 2003.
Sukup; "Wide Azimuth Marine Acquisition by the Helix Method": The Leading Edge; pp. 791-794; Aug. 2002.
Pan; "Single-Sensor Towed Streamer Improves Seismic Acquisition"; Offshore; Apr. 2002.
Austad, et al.; Marine Seismic Cable Streering and Computerized Control Systems; Society of Exploration Geophysicists, Expanded Abstracts; 2000.

(56) References Cited

OTHER PUBLICATIONS

Bittleston, et al; Marine Seismic Cable Streering and Control; EAGE 62nd Conference and Technical Exhibition, Glasgow, Scotland; May-Jun. 2000.
Beasley, et al.; A New Look at Simultaneous Sources; SEG Expanded Abstracts; 1998.
Wong, et al.; "Sampling with Hammersley and Halton Points"; 2 Journal of Graphics Tools; pp. 9-24; 1997.
Pedersen; A Nautical Study of Towed Marine Seismic Streamer Cable Configurations; Norwegian University of Science and Technology Doctoral Thesis; 1996.
Pedersen; Active 3-D Position Control of Marine Flexible Cylinder Cables with Extremely Large Length/Diameter-Ratio; NTH Department of Marine Hydrodynamics; 1994-1995.
Reilly, et al; "Concentric Circle 3D: Optimization of Salt Diapir Flank Imaging UK Central North Sea"; First Break; vol. 12, No. 9; pp. 463-475; Sep. 1994.
Shames; Mechanics of Fluids, 3rd Ed.; McGraw-Hill; pp. 666-693; 1992.
Pedersen; A Feasibility Study of the Possibilty to Control the Horizontal Position of Seismic Streamer Cables; Division of Marine Hydrodynamics, The Norwegian Institute of Technology; Mar. 1992.
Raven; Automatic Control Engineering, 4th Ed.; McGraw-Hill; 1987.
Cole, et al.; "A Circular Seismic Acquisition Technique for Marine Three Dimensional Surveys"; Offshore Technology Conference, 4864; Houston, Texas; May 6-9, 1985.
Shames; Engineering Mechanics—Statics and Dynamics, 3rd Ed.; Prentice Hall; pp. 236-244; 1980.
Longobardo; Automatic Controls; Standard Handbook for Mechanical Engineers; pp. 16-33 through 16-34; 1967.
Lee; An Algorithm for Path Connections and its Applications; IRE Transcations on Electronic Computers; pp. 346-365; Sep. 1961.
Kalman; A New approach to Linear Filtering and Prediction Problems; Trans of ASME—Journal of Basic Engineering; vol. 82 (Series D); pp. 35-45; 1960.
Brink M., et al., "Wide Tow Marine Seismic Surveys: Parallel or Opposite Sail Lines," Offshore Technology Conference, May 1997.
Cole, R. "Three dimensional marine seismic data acquisition using controlled streamer feathering," SEG Conference in 1988.
Moldoveanu, et al., "What is the Next Step After WAZ for Exploration in the Gulf of Mexico?," SEG Houston International Exposition and Annual Meeting, pp. 41-45 2009.
Philip M. Fontana, "Wide-Azimuth Towed Streemer acquisition offers a bright future for finding new reserves in complex geologic settings," E&P Global Exploration & Production News, CGGVeritas, 3 pages.
Qin, et al. "An Overview of Industrial Model Predictive Control Technology," 1996 at http://www.che.utexas.edu/~qin/cpcv/cpcv14.html retrieved Dec. 28, 2006.
"Wide-Tow Streamer 3D Acquisition: Fundamentals," Tech Link PGS Geophysical, vol. 5, No. 6, Aug. 2015.
Office Action for the equivalent Norwegian patent application 20110056 dated Apr. 8, 2018.

* cited by examiner

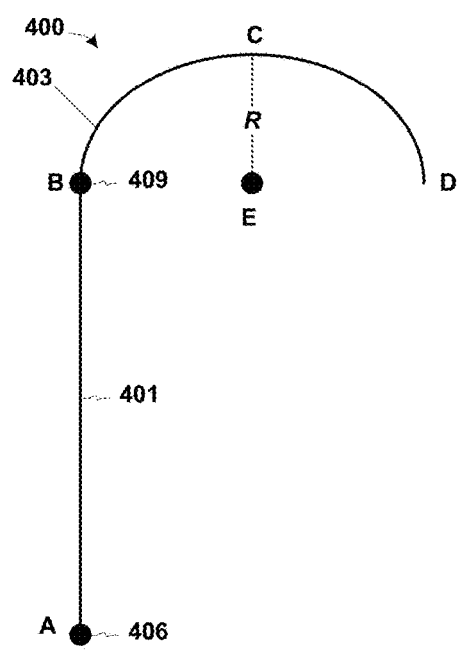
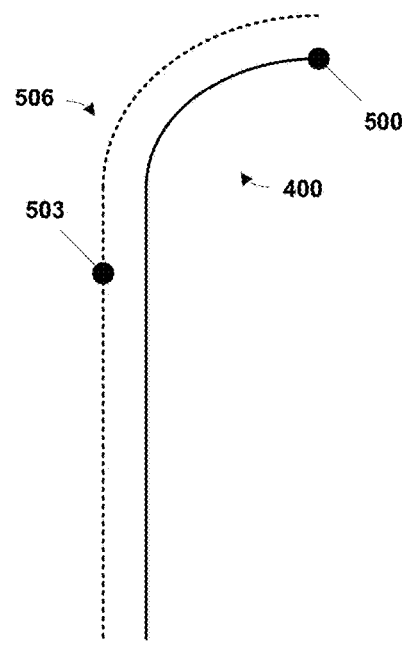
FIG. 4
FIG. 5
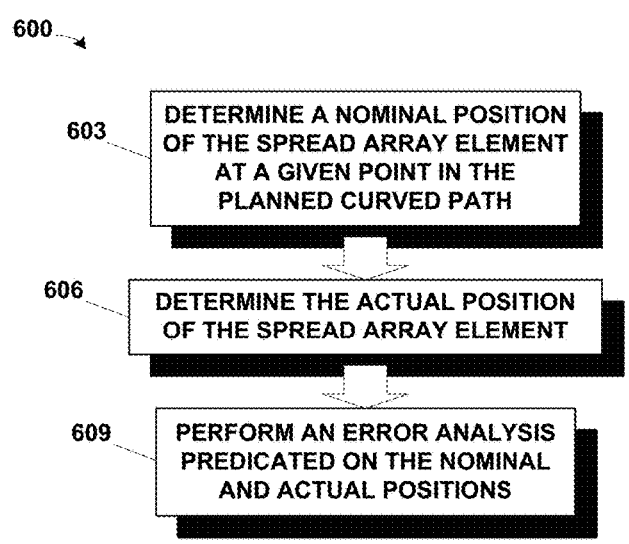
FIG. 6

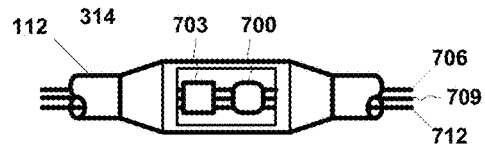
FIG. 7
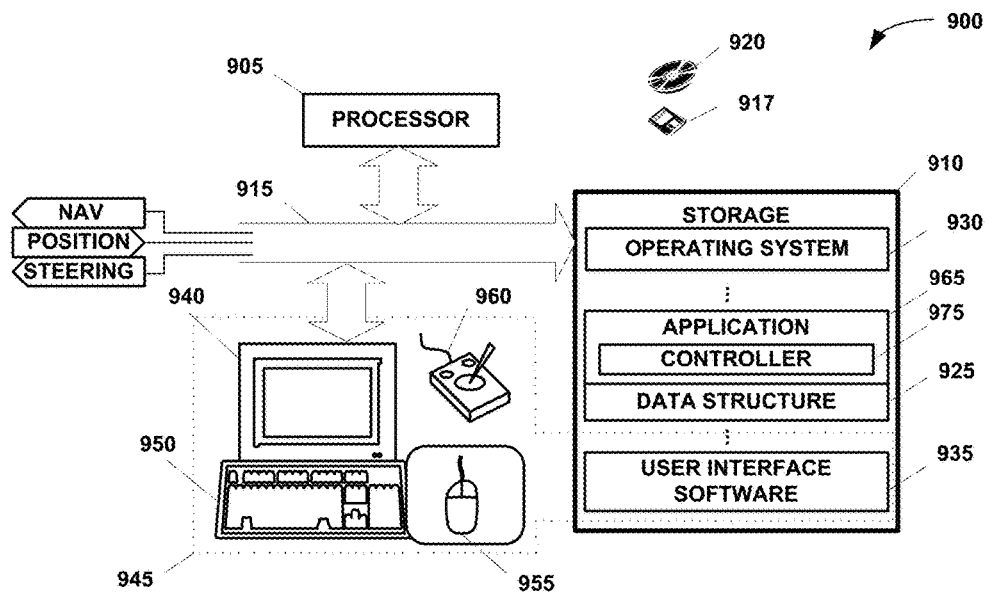
FIG. 9A
FIG. 9B

US 10,082,589 B2

METHOD TO DETERMINE THE DEVIATION OF SEISMIC EQUIPMENT FROM A PLANNED CURVED PATH

CROSS-REFERENCE TO RELATED APPLICATIONS

This application is a continuation of U.S. patent application Ser. No. 12/468,477, filed May 19, 2009 and titled "Method to Determine the Deviation of Seismic Equipment From a Planned Curved Path", which claims the benefit and priority to U.S. Provisional Application Ser. No. 61/061,330, filed Jun. 13, 2008 and titled "Method to Determine the Deviation of Seismic Equipment from a Planned Curved Path", the entire disclosures of which are incorporated herein by reference in their entirety.

STATEMENT REGARDING FEDERALLY SPONSORED RESEARCH OR DEVELOPMENT

Not applicable.

BACKGROUND OF THE INVENTION

1. Field of the Invention

The present invention pertains to towed-array marine seismic surveys, and, more particularly, to towed-array marine seismic surveys employing generally advancing curved sail lines.

2. Description of the Related Art

This section of this document is intended to introduce various aspects of the art that may be related to various aspects of the present invention described and/or claimed below. This section provides background information to facilitate a better understanding of the various aspects of the present invention. As the section's title implies, this is a discussion of related art. That such art is related in no way implies that it is also prior art. The related art may or may not be prior art. It should therefore be understood that the statements in this section of this document are to be read in this light, and not as admissions of prior art.

The exercise of examining subterranean geological formations for deposits of hydrocarbon deposits is known as "seismic surveying". Sometimes the geological formations lie beneath a body of water. This type of seismic survey is known as a "marine" seismic survey. Marine seismic surveys may be performed in salt, fresh, or brackish waters and are not limited to saltwater environments.

One type of marine seismic survey is called a "towed-array" seismic survey. In such a survey, a tow vessel tows an array of equipment along a straight sail line. The array usually includes a number of seismic streamers, typically up to eight of them, up to several kilometers long. The streamers are populated with a number of instruments, most notably seismic receivers such as hydrophones. Sometimes the array will also include a plurality of seismic sources. As the array is towed, the streamers ideally straighten and roughly parallel each other. Sometimes environmental or survey conditions adversely impact the shape of the array, but this is the ideal shape.

Thus, in conventional seismic survey acquisition, it is typical to determine where the components of equipment deployed in the sea to acquire seismic data are in relation to the sail line. These lines are straight with the exception of special acquisition patterns such as undershoot obstruction avoidance. Another exception is 4D acquisition that has an objective to follow a path that was traversed during an earlier survey.

All these acquisition patterns can be examined with respect to the planned path with a conventional straight line reference. This is often described as "along" and "across" or "cross line" and "in line". Distance from the planned preplot line to the shot event position of the seismic equipment is determined for the purpose of quality control in this reference frame. In addition to quality control, steering equipment such as streamer and source steering devices and systems and the towing vessel itself can make decisions based on variations in the conventional reference frame. The reference frame used has the same origo and the axes the same direction for at least one shot. In the case of the vessel reference frame the vessel motion is irrelevant since the vessel structure rigid body reference system is the reference. In the case of a survey area reference frame the vessel and towed equipment are all evaluated with respect to an origo and orthogonal axes fixed with respect to the earth.

Traditionally seismic surveys have been shot along straight lines defined by a start and end point defining a sail line. A lot of quality control ("QC") and statistics to users are simply based on a coordinate system with origo in the first point and Y axis in the direction of the second point. Two central numbers used are the "distance across" (or, "DC") and the "distance along", or ("DA").

The distance along is the y coordinate in this coordinate system, and distance across is the x coordinate. The direction from the first to the second point is called the line direction. The sources are usually fired evenly along this line—for example, every 25 m. The point where the source fires is called a "shot point," and each shot point is given a shot point number. The shot point number will decrease or increase along the line.

The survey of some complex subterranean structures benefits from particular types of towed-array surveys sometimes called "wide-azimuth", "rich-azimuth", or multi-azimuth surveys. However, these types of surveys are typically expensive both in terms of survey time and survey resources. One recently developed approach to address these concerns is what is known as a "coil shoot". A coil shoot differs from a traditional shoot significantly in that the path is intended to be curved rather than straight. With coil shooting a seismic 'line' can consist of any sequence of circular segments and straight segments. One difficulty associated with coil shoots is that a lot of the existing statistics and attributes calculated make little sense with coil shooting. With coil shooting a seismic 'line' can consist of any sequence of circular segments and straight segments. The quality control techniques used in conventional surveys with respect to the plan are not meaningful when acquiring a curved acquisition pattern.

The present invention is directed to resolving, or at least reducing, one or all of the problems mentioned above.

SUMMARY OF THE INVENTION

The invention is a group of techniques that can be used to determine if components of a seismic spread have deviated from a planned path during a coil or other curved and substantially circular acquisition pattern. In one aspect, the presently disclosed techniques include a computer-readable program storage medium for determining the deviation of spread array element from a planned curved path during a towed-array marine seismic survey. The method comprises: determining a nominal position of the spread array element at a given point in the planned curved path; determining the actual position of the spread array element; and performing an error analysis predicated on the nominal and actual positions.

The above presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

BRIEF DESCRIPTION OF THE DRAWINGS

The invention may be understood by reference to the following description taken in conjunction with the accompanying drawings, in which like reference numerals identify like elements, and in which:

FIG. 4 illustrates a preplot curve and the determination of various characteristics thereof—namely, distance across and distance along;

FIG. 5 illustrates the determination of nominal array element position given nominal offsets and a preplot curve;

FIG. 6 illustrates one particular embodiment of a method for determining the deviation of seismic equipment from a planned curved path;

FIG. 7 illustrates the instrumented sondes of the streamers of survey spread in FIG. 3;

FIG. 9A-FIG. 9B shows a rack mounted computer system such as may be used in some aspects of the present invention.

Figure 1:
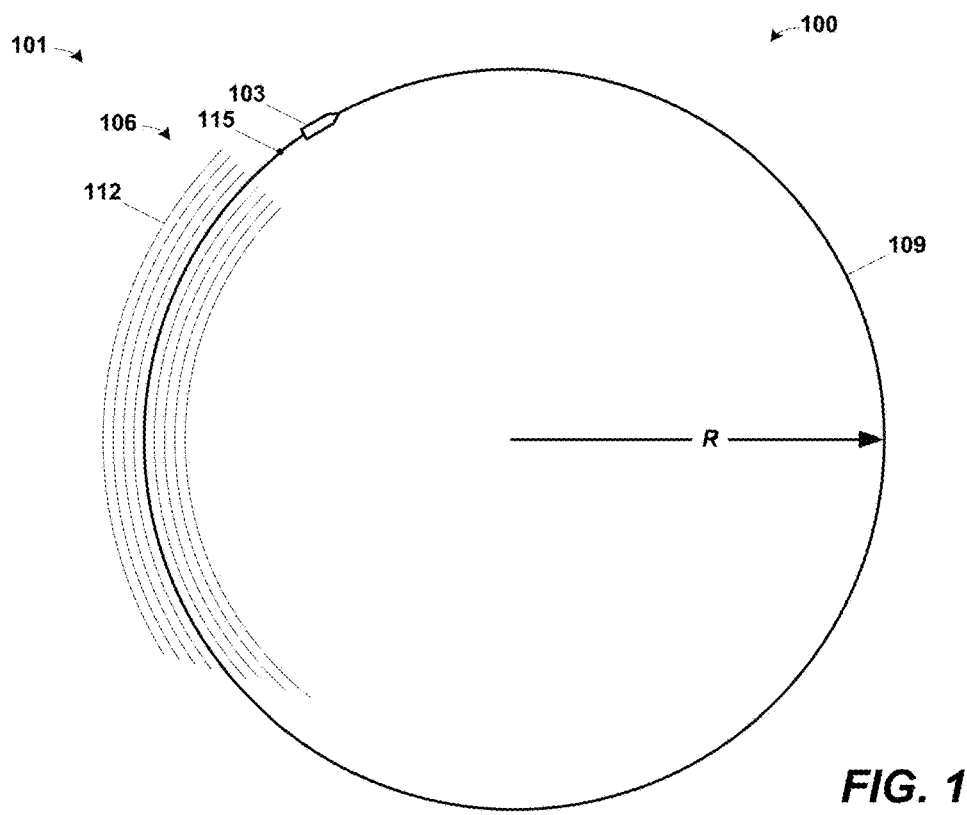
FIG. 1 is a plan, overhead schematic view of a first embodiment of a coil shoot with which the presently disclose technique may be used.

While the invention is susceptible to various modifications and alternative forms, the drawings illustrate specific embodiments herein described in detail by way of example. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

One or more specific embodiments of the present invention will be described below. It is specifically intended that the present invention not be limited to the embodiments and illustrations contained herein, but include modified forms of those embodiments including portions of the embodiments and combinations of elements of different embodiments as come within the scope of the following claims. It should be appreciated that in the development of any such actual implementation, as in any engineering or design project, numerous implementation-specific decisions must be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Nothing in this application is considered critical or essential to the present invention unless explicitly indicated as being "critical" or "essential."

The present invention will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention.

The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

The invention is a description of algorithms and methods that allow real time and post survey quality control of positions with respect to a substantially non-straight pre-survey plan as would be used in coil, spiral or circular shooting. The key elements of the method relate the object subjected to quality control to a dynamic reference frame and relate the coordinates of the object to the correct current path plan. In addition, methods that present errors in actual positions with respect to planned positions are displayed and quantified in a straight line presentation.

The presently disclosed techniques addresses new statistics/attributes for coil shoot surveys replace existing attributes used in conventional, straight-line surveys. A goal is that these attributes will mean the same as the existing attributes for traditional surveys, but still be meaningful for coil surveys. For DA/DC calculations this means that the closest point on the sail line curve is found. The distance across is then simply the distance to this point. The distance along is the length of the sail line up to this point. This seems like an intuitive and natural way of calculating these statistics, and would give the same result as current calculations for traditional straight lines.

The techniques also determines where equipment is compared to where it ideally should be. The rightmost tail buoy might, for example, have a nominal crossline offset of 200 meter and an inline offset of 8000 meters. (That is, if the vessel was going straight, one would expect the equipment to be 8000 meters behind the vessel and 200 meters to the right.) So during the survey one might want to know where the tail buoy should be at, for example, shot number 1024. The vessel is in a curved segment. The technique finds this point by making a parallel line starting 200 meters from the nominal vessel position and moving 8000 meters backwards along this line.

Turning now to the drawings, FIG. 1 depicts a portion of a towed-array, marine seismic survey 100. The seismic survey 100 includes a seismic spread 101, which comprises a survey vessel 103 towing an array 106 on a generally advancing curved path over a sail line 109. In the illustrated embodiment, the array 106 includes a plurality of streamers 112 (only one indicated) and a source 115. As will be discussed further below, the invention admits a high degree of variation in the implementation of the array 106 and the sail line 109. Those in the art will appreciate that the sail line 109 does not actually have a tangible manifestation, and that the line in the drawing graphically represents that which is intangible in practice.

Figure 2:
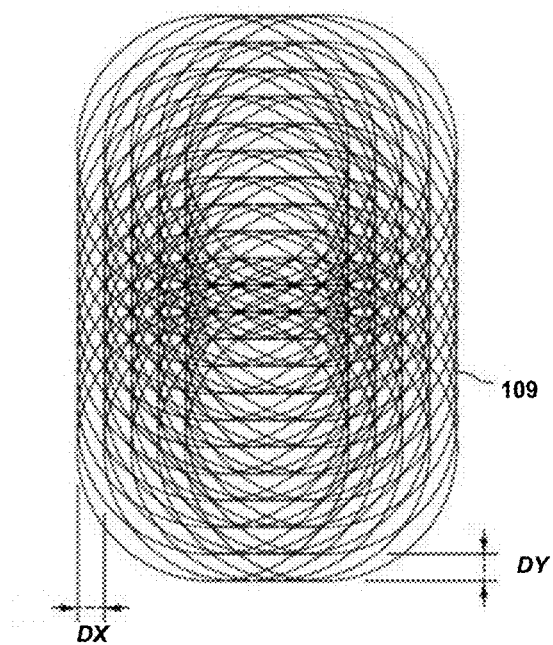
FIG. 2 is a computerized rendition of a plan view of the survey area covered by generally circular sail lines of the embodiment of FIG. 1 over time during a shooting and recording survey.

Those in the art having the benefit of this disclosure will appreciate that the sail line 109 is not truly circular. Once the first pass is substantially complete, the survey 100 will move slightly in the y-direction (vertical) value of DY, as illustrated in FIG. 2. The spread may also move in the x-direction (horizontal) by a value DX. Note that "vertical" and "horizontal" are defined relative to the plane of the drawing.

FIG. 2 is a computerized rendition of a plan view of the survey area covered by the generally circular sail lines of the seismic spread and method of FIG. 1 over time during a shooting and recording survey, where the displacement from circle to circle is DY in the vertical direction and DX in the horizontal direction. In FIG. 2, several generally circular sail lines 109 (only one indicated) cover the survey area. In this example, the first generally circular sail line was acquired in the southeast ("SE") corner of the survey.

When a first generally circular sail line 109 is completed the vessel 103 (shown in FIG. 1) moves along the tangent with a certain distance, DY, in vertical direction, and starts a new generally circular sail line 109. Several generally circular sail lines 109 may be traversed until the survey border is reached in the vertical direction. A new series of generally circular sail lines 109 may then be acquired in a similar way, but the origo will be moved with DX in the horizontal direction. This way of shooting continues until the survey area is completely covered.

The design parameters for designing the survey 100 the radius R of the circle, the radius being a function of the spread width and also of the coverage fold desired; DY, the roll in the y-direction; DX, the roll in the x-direction. DX and DY are functions of streamer spread width and of the coverage fold desired to be acquired. The radius R of the circle may be larger than the radius used during the turns and is a function of the streamer spread width.

The total number of kilometers acquired over a given area depends on the circle radius R and the values DX and DY. The total number of shots acquired with the coil shooting technique disclosed herein increases with increased radius R. DX and DY may range from about 0.5 W to about 2 W, or from about 0.5 W to about W, where W is the streamer spread width. The value of DX and DY may be selected based on the survey objectives. For instance for a development type survey DX and DY should be smaller than for an exploration survey. Also, as DX and DY determine the source sampling, processing requirements should be considered when the survey is designed.

Figure 3:
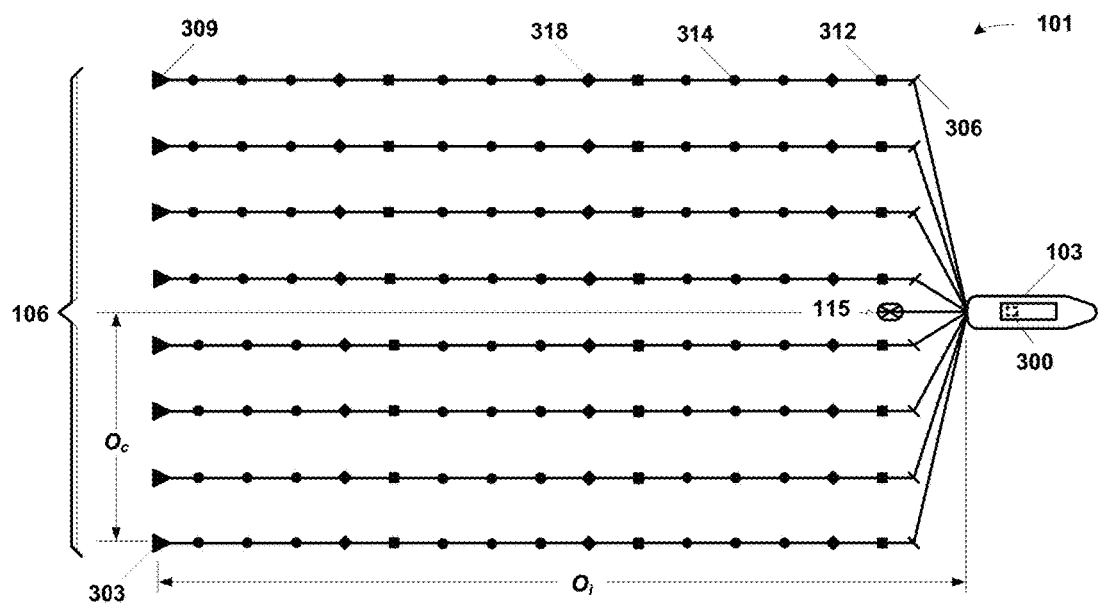
FIG. 3 depicts one particular embodiment of the survey spread first shown in FIG. 1 in a plan, overhead view.

FIG. 3 depicts one particular embodiment of the survey spread 101 in a plan, overhead view. In this particular embodiment, as mentioned above, the seismic spread 101 generally includes an array 106 towed by a survey vessel 103 on board of which is a computing apparatus 300. The computing apparatus 300 controls the seismic spread 101 in a manner discussed more fully below. The towed array 106 comprises eight marine streamers 112 (only one indicated). The seismic source 115 is also included. The survey spread 101 is shown after deployment but before embarking upon the sail line 109, shown in FIG. 1. Consequently, the streamers 112 are shown in a straight arrangement rather than curved one of FIG. 1. As alluded to above, one way of describing the position of various elements of the seismic spread 101 is in terms of inline and crossline offsets $O_i$ and $O_c$, respectively. An example was given using the rightmost tail buoy 303.

As those in the art will appreciate, the sail lines 109 of the seismic survey 100 are determined with a great deal of consideration. Preliminary data about the area under survey is used to define the characteristics of the survey and the sail lines 109 are determined. These nominal sail lines 109 that are determined prior to the survey may be referred to as "preplots" for the actual sail lines 109 traversed by the seismic spread 101. In the present case, since the survey will employ a coil shoot, the preplots are at least in part curved, and so may be referred to as "preplot curves".

It is desirable for the sail lines 109 to precisely coincide with their preplot curves. This desire also extends to the elements of the array 106. This can be particularly difficult to achieve for the array. For example, the survey vessel 103 has its own means for propulsion and navigation, and can typically maintain its position on the preplot quite well. However, this is not true of the array. The streamers 112, for example, are particularly subject to strong currents and weather conditions to be driven off the preplot during the survey. The technique disclosed herein is intended for use in determining deviation of the elements of the seismic spread 101 from the preplot curve so that position corrections can be made.

Turning now to FIG. 4, a preplot curve 400 is a sequence of geographical coordinates and a radius R. The preplot curve 400 gives the nominal position for some point in the survey. This normally coincides with the desired position of a survey element for this point. (For repeat/4D surveys this is not necessarily true—it then describes the nominal position, but not necessarily the desired position.) Often, the preplot curve describes the desired source mid-point position.

As described above relative to FIG. 3, all equipment has a nominal offset. That is the x-y coordinates in a coordinate system with origo in the vessel and y axis in the sail direction. It is assumed straight streamers etc. The values are calculated based on known characteristics of the seismic spread, such as lengths of equipment. In the example given above, the rightmost tail buoy 303 of the seismic spread 101 has an inline offset $O_i$ of 8000 meters behind the survey vessel 103 and a crossline offset $O_c$ of 200 meters to the right. That is, if the survey vessel 103 was traveling in a straight line, one would expect the equipment to be 8000 meters behind the vessel and 200 meters to the right. The nominal offset will be known as a design feature of the seismic spread 101.

Consider first Distance Across and Distance Along calculations. The preplot itself usually states the position of one specific point, for example the source mid point, vessel position or CMP position. As long as one knows the individual offset differences between these points, one can easily compensate for this. All the nominal offsets might be stored relative to, for example, center first group, while the preplot itself denotes nominal source mid point positions. This 'mismatch' is easily compensated for as long as both the nominal offset for center first group and source mid point is known.

For example, assume that the line AB in FIG. 4 is 500 m, the half circle BD is 200 m, and the line CE is 50 m. To find the distance across and the distance along (collectively, "DC/DA") for point E, the determination is as follows:

DA=500+200/2=600

DC=50

Note that this defines a new type of coordinate system 'normalized' to a varying path. In the old way of calculating it was simple to transform between Easting/Northing and DA/DC since it was simply two different coordinate systems with different orientations and different origo. This new way of calculating still relatively easily transforms DA/DC to Easting/Northing. However the transform of Easting/Northing to DA/DC does not make sense anymore because of the nature of the coil shoot.

Imagine two circles (not shown). A position can easily be as close to one as to the other. Also a position occurred at some time, which means it belongs to one of the circles. However the transform with the aid of a shot number makes sense:

Easting/Northing+shotNumber→DA/DC

One will first find either a straight or curved segment where this shot number occur, then perform a local search to find the closest position in that area, calculate DA to this point, and the DC is given by the distance to this closest point.

Consider now the calculation of nominal positions for spread elements, in which it will be assumed that the spread elements follow the preplot curve 400 perfectly. In calculating nominal positions, given a shot number, one can calculate a corresponding preplot position 500, shown in FIG. 5. It is a bit more complex calculating a position given with a nominal crossline/inline offset from the preplot curve 400. Assume that other position 503 to be calculated has a crossline nominal offset of −100, and an inline nominal offset of −1000. To find the nominal offset, one moves 1000 meters backwards on the parallel line 506. The distance between the lines is then 100 meters.

In general, the task can be divided into two parts. First, the nominal (desired) positions for any piece of equipment is determined given equipment nominal offset and shot number. Second, error statistics are calculated given actual positions.

Returning to FIG. 4, the preplot curve 400 for a coil shoot survey consists of straight segments 401 and circular segments 403. Straight segments 401 and circular segments 403 are collectively referred to as "path segments". Each preplot curve 400 therefore comprises a plurality of path segments that are either straight segments 401 or circular segments 403. For each straight segment 400, the start position 406 and the end position 409 are known. For each circular segment 403 the origo, the start position, and the total circle segment angle are known.

For each path segment certain attributes may be determined, and the determination will vary for the segments 401, 403. The segment length, for example, is a function of nominal offset x. The segment length for a straight segment 400 is the length of the segment from is start 406 to its end 409. For circular segments 403, segment length will vary with different crossline offsets because a crossline offset will effectively increase or decrease the circle radius. Position and heading are a function of along and across distance. Given a certain distance from the start of a segment and a certain crossline offset, one can calculate a position with a heading. For circular segments 403, this will be a tangent to the circle in that point. For a straight segment 400 it will be the direction from the start 406 to the end 409. The closest segment position and heading are a function of actual position. Given an actual position the closest position on the segment is found. Special handling will be triggered if the closest position is either at the start or the end of the segment.

Given a sequence of path segments 401, 403 and the shot increment, the shot distance, and the first shot number, one can calculate certain attributes. The shot increment is how the shot numbers change. Usually it is plus or minus one. If the first shot point is 1000, and the shot increment is 1, the next shot number will be 1001. The shot distance is the meter difference between two shots. If the shot distance is 25 meters, it should be 25 meters between where shot 1000, and 1001 is fired.

The higher level functions are nominal position and heading and across and along.

Nominal position and heading are a function of shot number, nominal offset x and nominal offset y. It is not difficult to convert a shot number to a distance along the preplot curve. Ignoring the offset, one can easily find which path segment 400, 403 contains the position for that shot because the length of each segment is known. Having found that position, certain other calculations are performed to compensate for the nominal offsets. This might bring one to another segment path altogether. This function is also used as a basis for calculating the difference between nominal position and actual position based on shot number. Returning the nominal position and the heading this can be done by making a coordinate system with origo in the nominal position, y axis in the heading direction and transforming the actual position to this coordinate system. The new x and y coordinates of the transformed position would then denote crossline and inline position error compared to nominal positions.

Across and along are functions of shot number, nominal offset x, nominal offset y and actual position. Given an actual position, we cannot uniquely find a closest path position. Or rather it might not make much sense. An actual position might be just as close to a point on one circle as another, even though the position was actually 'occurred' on the other circle. Therefore really the shot number needs to be taken into consideration. We first find which segment the position nominally should belong to. (Just using shot numbers and nominal offsets) We then do a local search to find the closest position to the actual position. This may be on another segment altogether. The closest position will give us the distance along value. The distance between the closest position and the actual position will give the across value.

Thus, in one aspect, the presently disclosed techniques includes a computer-readable program storage medium 600, shown in FIG. 6, for determining the deviation of spread array element from a planned curved path during a towed-array marine seismic survey. The method 600 comprises:

determining (at 603) a nominal position of the spread array element at a given point in the planned curved path;

determining (at 606) the actual position of the spread array element; and performing (at 609) an error analysis predicated on the nominal and actual positions.

The error analysis can be the same types of error analyses performed in this context in conventional practice where the analysis is performed upon information from a conventional sail line following a straight path.

More particularly, performing (at 609) the error analysis in FIG. 6 is what occurs after computing the nominal and the actual positions relative to the path. For example:

the difference between the desired position and the actual position (of steered survey elements) is used by the steering system (DSC/Q-Pilot) to issue steering commands so that the path is followed;

the difference may also be used to produce plots of the error (deviation from the desired position in an across/along reference frame) for display to the user (monitoring the system performance) in real time; and the path-relative across values (and across/along separations between survey elements) are used to compute statistics that can prove whether or not the certain survey specifications are being met, and also produce plots for display (manual QC) to the user.

This list is not exhaustive, and those of ordinary skill in the art having the benefit of this disclosure will appreciate still other error analyses that may be performed in addition to, or in lieu of, those listed. Note that such statistics (e.g., crossline distance between seismic source arrays) are usually required in any seismic survey, but are meaningless in a conventional fixed coordinate system traditionally used for straight line seismic when used for a coil shoot. (Across and along blend as the circle is traversed).

The algorithm may be used for one or both of real time positioning (steering) of the vessel and spread, and afterwards for quality control and statistics. In real time, the algorithm is used by the applications that are responsible for steering the vessel, sources and streamers. In order to be able to automatically steer along the curved path, the control system needs to know the actual positions of the survey elements vs. the desired position, in an across/along sense. The presently disclose technique imparts this information. Afterwards, the algorithm is used to compute along/across values and along/across errors for use in Quality Control.

In the embodiments illustrated herein, the presently disclosed technique is not used to process errors out of the data. It is instead used to produce statistics that confirm that the specifications have been met, and to draw displays that enables to user to visually see along/across related data. For example:

The specifications for the survey might contain Crossline separations between streamers shall be 100 m+/−5%, for 90% of the shot points. The technique is involved in computing the statistics needed to verify whether this specification was met.

The user views various plots (for example time-series plots) of crossline/inline values and differences for a variety of survey elements (such as GPS positions, acoustic hydrophones etc.). Because all positions are stored in geographical coordinates, the technique is used to compute path-relative along/across values for display.

As was mentioned above, the present invention admits variation in the implementation of the sail lines 109 and those described above are exemplary only. The present invention may be used in connection with any of a number of coil shooting techniques known to the art. Several such techniques are disclosed in U.S. application Ser. No. 12/121,324, filed May 15, 2008, and in U.S. application Ser. No. 11/335,365, filed Jan. 19, 2006. Both of these applications are incorporated by reference below for their teachings with regards to the coil shooting techniques disclosed therein.

As disclosed in those applications, a "generally curved advancing path" is one in which the vessels and streamers travel generally in a curve, and there is an advancement in one or more of the x- and y-directions. The path may be expressed as a coil. The curve may be circular, ovoid (including one or more ovals), elliptical (including one or more ellipses), figure-eight, sinusoidal, or some other curved path. The path may vary within the same survey; for example, a first portion of the survey may follow an ovoid path, a second portion of the survey may follow an elliptical path, as one of many examples.

Note that the present technique includes methods wherein the survey vessels—and, hence, the seismic spread—travel clockwise or counterclockwise. Generally, there is no intrinsic advantage of one direction over the other. However, in embodiments where a single survey vessel travels along a sincurve both clockwise and counterclockwise there may be an advantage in the presence of localized strong currents. The clockwise versus counter-clockwise directions may be selected at the beginning of each new swath as a function of the currents. It is generally not practical to change direction from circle to circle (for example clockwise then counter-clockwise) due to loss of time.

Also as mentioned above, the invention admits variation in the implementation of the seismic survey spread by which the coil shooting is implemented. Several variations in the composition and configuration of the spread used for coil shooting are disclosed in U.S. application Ser. No. 12/121,324, filed May 15, 2008, and in U.S. application Ser. No. 11/335,365, filed Jan. 19, 2006. Both of these applications are incorporated by reference below for their teachings with regards to the coil shooting techniques disclosed therein, including the composition and configuration of the spread.

Some embodiments employ Q™ and Q-MARINE™ technologies. As used herein, "Q™" is the WesternGeco proprietary suite of advanced seismic technologies for enhanced reservoir location, description, and management. "Q-MARINE™" systems, as discussed herein, refer to the marine seismic spreads employed by WesternGeco and having an accurate positioning system; streamer steering; and advance noise attenuation capabilities. For additional information on Q-Marine™, a fully calibrated, point-receiver marine seismic acquisition and processing system, as well as Q-Land™ and Q-Seabed™, see http://www.westerngeco.com/q-technology.

In these systems, streamers may be equipped with acoustic transmitters and point receivers for accurate position determination, employing intrinsic ranging modulated acoustics, as taught in U.S. Pat. No. 5,668,775 ("the '775 patent"), incorporated below. As taught in the '775 patent, the streamer transmitters and point receivers may form a full-streamer-length acoustic network, wherein a unique spread spectrum code of acoustic frequencies are emitted by each of a plurality of acoustic transmitters placed within the streamers, all frequencies being within the seismic frequencies detected by the same receivers during shooting and recording, and the point receivers within the streamers are able to distinguish each transmitter's unique code. Thus, accurate positioning of seismic receivers is possible. Conventional streamers use arrays of hydrophones, such as 12 or 18 hydrophones per group, which are summed together in analog fashion and than recorded.

Furthermore, the single sensors or point receivers are placed in the streamer at intervals, for example one every 3 m to 4 m, and recorded. All point receivers route data to a computer, where digital filters are applied taking advantage of the very fine sampling of the receivers for very powerful coherent noise attenuation of line swell noise and/or streamer cable noise. During the turns the noise from marine current may be stronger, since at least portions of the streamers may be traveling cross-current. Noise can therefore be attenuated from each point receiver very well. Streamers may also be steered into desired positions by steering devices, as further described herein.

Returning now to FIG. 3, to further an understanding of the present invention, a more thorough discussion of the seismic spread 101 illustrated herein follows. As mentioned above, the seismic spread 101 generally includes an array 106 towed by a survey vessel 103 on board of which is a computing apparatus 300. The towed array 106 comprises eight marine streamers 112 (only one indicated) that may, for instance, each be 6 km long and separated by up to 100 m. Note that the number of streamers 112 in the towed array 106 is not material to the practice of the invention. These aspects of the apparatus may be implemented in accordance with conventional practice.

Note that these distances discussed herein are "approximate." As used herein, the term "approximate" acknowledges that which is commonly known in the art—namely, that it is difficult to consistently maintain the position of the streamers 112 throughout the entire seismic survey 101. Environmental conditions, such as tides and winds, frequently push all or parts of the streamers 112 out of their desired positions during the seismic survey 101. Accordingly, as is discussed further below, the streamers 112 include positioning devices to help offset these types of factors. Deviations from desired positions nevertheless occur and they may affect the crossline cable separation. The term "approximately" is a reflection of this reality and indicates that deviations from the modified distance that are within a degree commonly accepted by those in the industry in this context.

A seismic source 115 is also shown being towed by the survey vessel 103. Note that, in alternative embodiments, the seismic source 115 may not be towed by the survey vessel 103. Instead, the seismic source 115 may be towed by a second vessel (not shown), suspended from a buoy (also not shown), or deployed in some other fashion known to the art. The known seismic sources include impulse sources, such as explosives and air guns, and vibratory sources which emit waves with a more controllable amplitude and frequency spectrum. The seismic source 115 may be implemented using any such source known to the art. In the illustrated embodiment, the seismic source 115 comprises an air gun or an array of air guns At the front of each streamer 112 is a deflector 306 (only one indicated) and at the rear of every streamer 112 is a tail buoy 309 (only one indicated). The deflector 306 laterally, or in the crossline direction, positions the front end 113 of the streamer 112 nearest the survey vessel 103. The tail buoy 309 creates drag at the tail end 114 of the streamer 112 farthest from the survey vessel 103. The tension created on the streamer 112 by the deflector 306 and the tail buoy 309 helps shape the streamer 112.

Located between the deflector 306 and the tail buoy 309 are a plurality of seismic cable positioning devices known as "birds" 312. The birds 312 may be located at regular intervals along the seismic cable, such as every 200 m to 400 m. In this particular embodiment, the birds 312 are used to control the depth at which the streamers 112 are towed, typically a few meters. In one particular embodiment, the steerable birds 118 are implemented with Q-fin™ steerable birds as are employed by WesternGeco, the assignee hereof, in their seismic surveys.

The principles of design, operation, and use of such steerable birds are found in PCT International Application WO 00/20895, filed on Sep. 28, 1999 ("the '895 application"). However, any type of steerable device may be employed. For instance, a second embodiment is disclosed in PCT International Application No. WO 98/28636 filed Dec. 19, 1997 ("the '636 application"). In some embodiments, the birds 118 may even be omitted.

The streamers 112 also include a plurality of instrumented sondes 314 (only one indicated) distributed along their length. The instrumented sondes 314 house, in the illustrated embodiment, an acoustic sensor 700 (e.g., a hydrophone) such as is known to the art, and a particle motion sensor 703, both conceptually shown in FIG. 7. The particle motion sensors 703 measure not only the magnitude of passing wavefronts, but also their direction. The sensing elements of the particle motions sensors may be, for example, a velocity meter or an accelerometer.

Suitable particle motion sensors are disclosed in: U.S. application Ser. No. 10/792,511, filed Mar. 3, 2004; U.S. application Ser. No. 10/233,266 filed Aug. 30, 2002; and U.S. Pat. No. 3,283,293, issued Nov. 1, 1966. Each of these is incorporated below. Any suitable particle motion sensor known to the art may be used to implement the particle motion sensor 703. Thus, it would be possible to distinguish data representing upwardly propagating wavefronts, such as the reflections 135, from the downwardly propagating wavefronts, such as the multiple reflection 150.

In general, it is desirable for the noise measurements of the particle motion sensors 703 be taken as close to the point the seismic data is acquired by the acoustic sensors 700 as is reasonably possible. More distance between the noise data acquisition and the seismic data acquisition will mean less accuracy in the measurement of noise at the point of seismic data acquisition. However, it is not necessary that the particle motion sensor 703 be positioned together with the acoustic sensor 700 within the sensor sonde 314. The particle motion sensor 703 need only be located sufficiently proximate to the acoustic sensor 700 that the noise data it acquires reasonably represents the noise component of the acquired seismic data.

The sensors of the instrumented sondes 314 then transmit data representative of the detected quantity over the electrical leads of the streamer 112. The data from the acoustic sensors 700 and the particle motion sensors 703 may be transmitted over separate lines. However, this is not necessary to the practice of the invention. However, size, weight and power constraints will typically make this desirable. The data generated by the particle motion sensor 703 will therefore need to be interleaved with the seismic data. Techniques for interleaving information with this are known to the art. For instance, the two kinds of data may be multiplexed. Any suitable techniques for interleaving data known to the art may be employed.

Thus, the data generated by the sensors of the instrumented sondes 314 is transmitted over the seismic cable to the computing apparatus 300. As those in the art will appreciate, a variety of signals are transmitted up and down the streamer 112 during the seismic survey. For instance, power is transmitted to the electronic components (e.g., the acoustic sensor 700 and particle motion sensor 703), control signals are sent to positioning elements (not shown), and data is transmitted back to the vessel 103. To this end, the streamer 112 provides a number of lines (i.e., a power lead 706, a command and control line 709, and a data line 712) over which these signals may be transmitted. Those in the art will further appreciate that there are a number of techniques that may be employed that may vary the number of lines used for this purpose. Furthermore, the streamer 112 will also typically include other structures, such as strengthening members (not shown), that are omitted for the sake of clarity.

Figure 8:
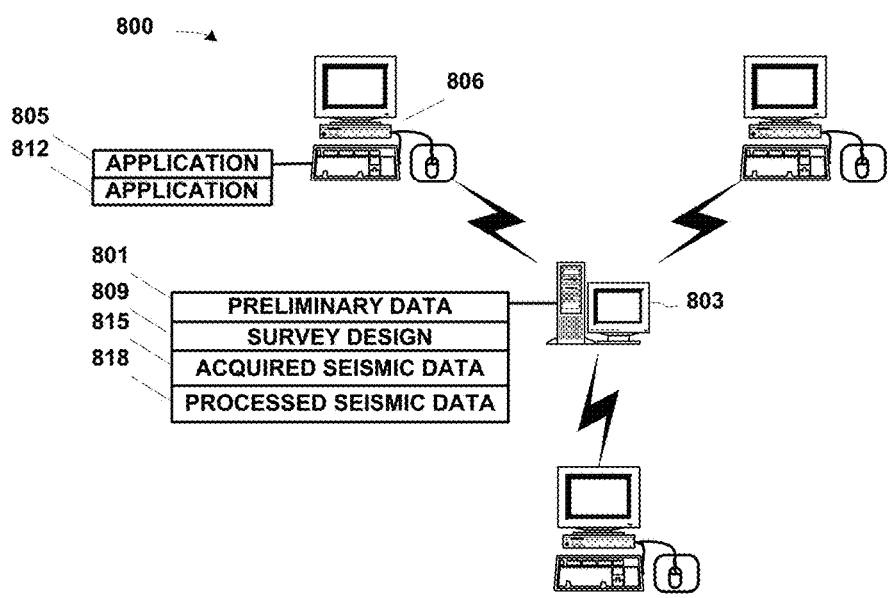
FIG. 8 depicts a computing system on which some aspects of the present invention may be practiced in some embodiments.

As those in the art will appreciate, the sail lines preplots are generated prior to the conduct of the survey. Preliminary studies of the survey area are made to determine survey characteristics that inform the design of the survey itself. In association with the presently disclosed technique, this is done in accordance with conventional practice. This is typically performed at a central processing facility of some kind that houses a computing system such as the computing system 800 in FIG. 8, comprising more than one computing apparatus. For example, the preliminary data 801 may reside in a data structure residing on a server 803 and the application 805 by which it is processed on a workstation 806 to generate the survey design 809.

The survey design 809 is then transported to the survey vessel 103 and loaded onto the computing apparatus 300. The computing apparatus 300 represents a variety of computing resources that fulfill a number of purposes in the survey 100. For example, and as will be appreciated by those in the art having the benefit of this disclosure, the survey vessel 103 will be equipped with computer-implemented navigation and control systems. However, these functionalities may be distributed across elements of the seismic spread 101 rather than concentrated in a single computing apparatus. Furthermore, the nature of the software control in terms of architecture or situs is material to the practice of the invention. For example, in some embodiments, the navigation and streamer steering may be performed by separate software components that may be, for instance, utilities or daemons.

FIG. 9A-FIG. 9B depict a rack-mounted computing apparatus 900 with which the navigation and control systems may be implemented. The computing apparatus 900 includes a processor 905 communicating with some storage 910 over a bus system 915. The storage 910 may include a hard disk and/or random access memory ("RAM") and/or removable storage such as a floppy magnetic disk 917 and an optical disk 920. The storage 910 is encoded with a data structure 925 storing the data set acquired as discussed above, an operating system 930, user interface software 935, and an application 965.

The user interface software 935, in conjunction with a display 940, implements a user interface 945. The user interface 945 may include peripheral I/O devices such as a key pad or keyboard 950, a mouse 955, or a joystick 960.

The processor 905 runs under the control of the operating system 930, which may be practically any operating system known to the art. The application 965 is invoked by the operating system 930 upon power up, reset, or both, depending on the implementation of the operating system 930. The application 965 issues navigation commands ("NAV") to the survey vessel 103 in accordance with its program to sail the survey vessel 103 on the generally advancing curved path of the sail line 109 and to tow the marine seismic streamers 112 and/or source 115, depending on the particular embodiment. The application 965 also, in this particular embodiment, receives positioning data ("POSITION") from the marine seismic streamers 112 and issues steering commands ("STEERING") to the steering devices thereon.

The positioning and steering functionalities described herein relative to the presently disclosed technique are, in the illustrated embodiment, implemented in a pair of modified software packages called TRINAV™ and REPEAT™. In particularly, they are modified to perform the technique disclosed herein. They are proprietary to WesternGeco L.L.C., the assignee hereof.

However, similar software is commercially available from a variety of sources. Concept Systems Ltd. markets a suite of suitable software tools for which additional information may be obtained over the World Wide Web from the company's website at http:www.iongeo.com/About_Us/Business_Units_and_Subsidiaries/Concept_Systems/. Concept Systems can also be contacted directly at 1 Logie Mill, Beaverbank Business Park, Logie Green Road, Edinburgh, EH7 4HG, Scotland, United Kingdom—(ph) +44 131 557 5595, fax+44 131 557 2367. Quest Geo Solutions Ltd. also offers suitable software tools that may be suitable for which additional information may be found on the World Wide Web at http://www.qgsl.com/; or directly Passfield Business Centre, Lynchborough Road, Passfield, Liphook, Hampshire, GU30 7SB, United Kingdom; or at (ph, UK) +44 (0) 1428 751565, (ph, US) +1 281 660 5480, or (fax) +44 (0) 1428 751566. This list is not exhaustive, however. Those of ordinary skill in the art having the benefit of this disclosure will be able modify these and other commercially available software to implement the presently disclosed technique.

Returning to FIG. 9A-FIG. 9B, the application 965 will either implement or invoke a controller 975. The control technique employed by the controller 975 will be implementation specific. A variety of suitable control techniques are disclosed in U.S. application Ser. No. 12/121,324, filed May 15, 2008, and in U.S. application Ser. No. 11/335,365, filed Jan. 19, 2006. Both of these applications are incorporated by reference below for their teachings with regards to the coil shooting techniques disclosed therein, including the control of the shape and position of the spread.

Some embodiments may incorporate one of the so-called Advance Spread Control systems and methods described in assignee's co-pending U.S. application Ser. No. 11/122,646, filed Mar. 5, 2005, incorporated below. In these systems, a marine seismic spread includes a vessel-mounted acoustic Doppler current meter to measure at least a horizontal component of a current velocity vector at least at one location generally ahead of the seismic spread elements. The measured horizontal component is then use to control position of a seismic spread element.

One particular embodiment implements these aspects of the disclosed technique include PID controllers. Controllers useful in the systems and methods of the invention may vary in their details. One PID controller useful in the invention may be expressed mathematically as:

$$u(t)=K_p[e(t)+1/T_i \cdot \smallint e(t)dt+T_d \cdot \dot{e}(t)] \qquad (1)$$

wherein:
∫=integrate;
$\dot{e}(t)$=the time derivative;
u(t)=controller output, either meters across to a tracking control device such as that known under the trade designation Robtrack/STS500, or heading to an autopilot;
e(t)=difference between wanted (planned, reference) and measured (current position, y) value;
$T_d$=a constant for describing the derivative part of the algorithm (the derivative part may be filtered to avoid deriving high frequencies);

$T_i$≡a constant for describing the integrating part of the algorithm; and $K_p$≡a proportional gain constant.

In the s-plane (Laplace), the PID controller may be expressed as:

$$H_r(s)=K_p[1+1/T_i s+T_d s/(1+T_f s)] \quad (2)$$

wherein:

s≡the variable in the s-plane; and $T_f$≡a constant describing the filtering part of the derivative part of the algorithm.

For discretization, a variety of transforms may be employed, and some constants may or may not be useful. For example, the $T_f$ constant may not be necessary in some instances, but may be especially useful in other scenarios. As one discretization example, the z-transform may be used, meaning that the integral part of the algorithm may be approximated by using a trapezoid model of the form:

$$s=(1-z-1)/T \quad (3)$$

while the derivative part may be approximated using an Euler model:

$$s=2/T \cdot (1-z-1)/(1+z-1) \quad (4)$$

wherein T is the sampling time. The resulting discrete model may then be used directly in the steering algorithm. Other discrete models, derived using other transforms, are useful in the invention, and will be apparent to control technicians or control engineers of ordinary skill.

Model Predictive Control ("MPC") is an advanced multivariable control method for use in multiple input/multiple output ("MIMO") systems. An overview of industrial Model Predictive Control can be found at: www.che.utexas.edu/~qin/cpcv/cpcv14.html. MPC computes a sequence of manipulated variable adjustments in order to optimize the future behavior of the process in question. At each control time k, MPC solves a dynamic optimization problem using a model of the controlled system, so as to optimize future behavior (at time k+1, k+2 . . . k+n) over a prediction horizon n. This is again performed at time k+1, k+2 . . . . MPC may use any derived objective function, such as Quadratic Performance Objective, and the like, including weighting functions of manipulated variables and measurements.

Dynamics of the process and/or system to be controlled are described in an explicit model of the process and/or system, which may be obtained for example by mathematical modeling, or estimated from test data of the real process and/or system. Some techniques to determine some of the dynamics of the system and/or process to be controlled include step response models, impulse response models, and other linear or non-linear models. Often an accurate model is not necessary. Input and output constraints may be included in the problem formulation so that future constraint violations are anticipated and prevented, such as hard constraints, soft constraints, set point constraints, funnel constraints, return on capital constraints, and the like.

It may be difficult to explicitly state stability of an MPC control scheme, and in certain embodiments of the present invention it may be necessary to use nonlinear MPC. In so-called advance spread control of marine seismic spreads, PID control may be used on strong mono-variable loops with few or non-problematic interactions, while one or more networks of MPC might be used, or other multivariable control structures, for strong interconnected loops. Furthermore, computing time considerations may be a limiting factor. Some embodiments may employ nonlinear MPC.

Feed forward algorithms, if used, will in the most general sense be task specific, meaning that they will be specially designed to the task they are designed to solve. This specific design might be difficult to design, but a lot is gained by using a more general algorithm, such as a first or second order filter with a given gain and time constants.

The introduction of a tracking point may serve at least two purposes. First, it gives a more flexible solution for a track that we want parts of the spread to follow. Second, if other means are used for controlling source positions, like a winch or a source deflector, the vessel will in many occasions have "spare" steering capacity available. This may mean that by moving the tracking point aft of the sources, streamer front ends and consequentially also the receivers may be closer to where they should be, which may help the streamer steering devices in achieving their steering objectives.

In certain embodiments, a tracking point will not be a static point in the spread, as time varying currents may result in the center of source steering objective and the tracking point steering objective unable to be met at the same time. In these embodiments, the tracking point may be moved, either dynamically or non-dynamically, until both objectives can be met with a certain slack. The reverse might also be the case, i.e., having excess steering power resulting in moving the tracking point further aft. If the movement of the tracking point is above a predefined distance, a new set of parameters for both the controller and the feed forward controller may be used to optimize the controller performance.

Note that these are exemplary control techniques only and that they are not exhaustive. Alternative control techniques may be employed in alternative embodiments. The invention is not limited by the type of control technique employed.

Returning to FIG. 3, the computing apparatus 300 receives the seismic data (hydrophone as well as particle motion sensor data), and records it. The particle motion sensor data is recorded in, for example, a data storage in any suitable data structure known to the art. The computing apparatus 300 interfaces with the navigation system (not shown) of the survey vessel 103. From the navigation system, the computing apparatus 300 obtains estimates of system wide parameters, such as the towing direction, towing velocity, and current direction and measured current velocity.

In the illustrated embodiment, the computing apparatus 300 also monitors the actual positions of each of the birds 312, as well as other elements of the streamers 112. The computing apparatus is programmed with the desired positions of or the desired minimum separations between the streamers 112 as well as other characteristics of the survey. The horizontal positions of the birds 312 can be derived using various techniques well known to the art. The vertical positions, or depths, of the birds 312 are typically monitored using pressure sensors (not shown) attached to the birds 312.

The shape of the streamer 112, and therefore the positions of its elements, during the survey may be determined using any of a variety of techniques known to the art. For instance, satellite-based global positioning system equipment can be used to determine the positions of the equipment. The Global Positioning System ("GPS"), or differential GPS, are useful, with GPS receivers (not shown) at the front and tail of the streamer. In addition to GPS based positioning, it is known to monitor the relative positions of streamers and sections of streamers through an acoustic positioning system comprised of a network of sonic transceivers 318 (only one indicated) that transmit and receive acoustic or sonar signals.

The computing apparatus 300, through execution of a controller 975, shown in FIG. 9A-FIG. 9B, then implements the method discussed above relative to FIG. 6 to determine the deviation of the elements of the seismic spread 101 from the preplot, both of which are shown in FIG. 1. Once the deviation is determined, the controller 975 then takes appropriate action to correct the position of the element deviating from the planned position.

The presently disclosed technique can also be used to perform error analysis on seismic data previously acquired in a coil shoot, seismic survey. For example, and returning to FIG. 8, a second application 812 residing on the workstation 806 may be invoked to operate on the acquired seismic data 815 to perform the method 600 of FIG. 6 to detect errors therein. The acquired seismic data 815 may have been recently acquired or it may be legacy data that has been archived for some time. The results of the error analysis can then be used to correct the errors to obtain a superior set of processed seismic data 818. Note also that this technique may be useful in the processing of time-lapse, or 4D data, as well.

The present technique as disclosed above allows real time and post survey quality control of positions with respect to a substantially non-straight pre-survey plan as would be used in coil, spiral or circular shooting. The elements of the method relate the object subjected to quality control to a dynamic reference frame and relate the coordinates of the object to the correct current path plan. In addition, methods that present errors in actual positions with respect to planned positions are displayed and quantified in a straight line presentation. Furthermore, in addition to computing path-relative across and along positions/offsets, the presently disclosed technique can (and will) also compute path-relative across and along velocities for survey equipment elements, which are used in both real time steering and quality control.

As is apparent from the discussion above, some aspects of the present invention are implemented in software executed by a computing apparatus. Some portions of the detailed descriptions herein are consequently presented in terms of a software implemented process involving symbolic representations of operations on data bits within a memory in a computing system or a computing device. These descriptions and representations are the means used by those in the art to most effectively convey the substance of their work to others skilled in the art. The process and operation require physical manipulations of physical quantities. Usually, though not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated or otherwise as may be apparent, throughout the present disclosure, these descriptions refer to the action and processes of an electronic device, that manipulates and transforms data represented as physical (electronic, magnetic, or optical) quantities within some electronic device's storage into other data similarly represented as physical quantities within the storage, or in transmission or display devices. Exemplary of the terms denoting such a description are, without limitation, the terms "processing," "computing," "calculating," "determining," "displaying," and the like.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

The following documents are incorporated by reference herein for all purposes as modified by the teachings set forth above as if set forth herein verbatim:

U.S. Provisional Application Ser. No. 61/061,357, filed Jun. 13, 2008, in the name of the inventors Stig Solheim and Kjell Saeten, and entitled, "Filtering and Presentation of Heading Observations for Coil Shooting"

U.S. application Ser. No. 11/335,365, filed Jan. 19, 2006, in the name of the inventors Nicolae Moldoveanu and Alan Strudley, and entitled, "Methods and Systems for Efficiently Acquiring Towed Streamer Seismic Surveys".

U.S. application Ser. No. 12/121,324, filed May 15, 2008, in the name of the inventors Nicolae Moldoveanu and Steven Fealy, and entitled, "Methods for Efficiently Acquiring Wide-Azimuth Towed Streamer Seismic Data".

U.S. Provisional Application Ser. No. 60/938,547 filed May 17, 2007, entitled, "Methods for Efficiently Acquiring Wide-Azimuth Towed Streamer Seismic Data", and filed in the name of the inventors Nicolae Moldoveanu and Steven Fealy.

U.S. Provisional Application Ser. No. 60/966,534 (converted from U.S. application Ser. No. 11/836,675, filed Aug. 9, 2007, by petition filed Aug. 31, 2007), entitled, "Methods for Efficiently Acquiring Wide-Azimuth Towed Streamer Seismic Data", and filed in the name of the inventors Nicolae Moldoveanu and Steven Fealy.

U.S. Provisional Application Ser. No. 60/969,203 filed Aug. 31, 2007, entitled, "Methods for Efficiently Acquiring Wide-Azimuth Towed Streamer Seismic Data", and filed in the name of the inventors Nicolae Moldoveanu and Steven Fealy.

U.S. application Ser. No. 11/836,675, filed Aug. 9, 2007, entitled, "Methods for Efficiently Acquiring Wide-Azimuth Towed Streamer Seismic Data", and filed in the name of the inventors Nicolae Moldoveanu and Steven Fealy, which was converted to U.S. Provisional Application Ser. No. 60/966,534 by petition filed Aug. 31, 2007;

U.S. application Ser. No. 11/114,773, filed Apr. 26, 2005, entitled, "Seismic Streamer System and Method", and filed in the name of the inventors Rohitashva Singh, et al., published Oct. 26, 2006, as Patent Publication 20060239117 A1;

U.S. application Ser. No. 11/122,646, filed Mar. 5, 2005, entitled, "Forward looking systems and methods for positioning marine seismic equipment", and filed in the name of the inventors Rune Toennessen, et al., published Nov. 16, 2006, as Patent Publication 20060256653 A1;

U.S. Pat. No. 5,668,775, entitled "Methods for determining the position of seismic equipment, and applications of the methods", and issued Sep. 16, 1997, to GECO A.S. in the name of the inventor Kjell Hatteland;

U.S. Pat. No. 6,671,223, entitled "Control devices for controlling the position of a marine seismic streamer", and issued Dec. 30, 2003, to WesternGeco, L.L.C. in the name of the inventor Simon H. Bittleston;

U.S. Pat. No. 3,774,570, entitled "Non-Rotating Depth Controller Paravane for Seismic Cables", and issued Nov. 27, 1973, to Whitehall Electronics in the name of the inventors Raymond H. Pearson;

U.S. Pat. No. 3,560,912, entitled "Control System for a Towed Vehicle", and issued Feb. 2, 1971, to Westinghouse Electric Corporation in the name of the inventors P. G. Spink, et al.;

U.S. Pat. No. 5,443,027, entitled "Lateral force device for underwater towed array", and issued Aug. 22, 1995, to The United States of America as represented by the Secretary of the Navy in the name of the inventors Norman L. Owsley;

U.S. Pat. No. 3,605,674, entitled "Underwater Cable Controller", and issued Sep. 20, 1971, to Dresser Industries, Inc. in the name of the inventor Raymond C. Weese;

U.S. Pat. No. 4,404,664, entitled "System for laterally positioning a towed marine cable and method of using same", and issued Sep. 13, 1983, to Mobil Oil Corporation in the name of the inventor Robert G. Zachariadis;

U.S. Pat. No. 6,525,992, entitled "Devices for controlling the position of an underwater cable", and issued Feb. 25, 2003, to Input/Output, Inc. in the name of the inventors Andrew W. Olivier, et al.; and EP Patent Publication No. EP 0613025, entitled "A Device and Method for Positioning of Towing Systems for Use in Marine Seismic Systems", and filed Feb. 22, 1994, in the name of the inventor Tor Elholm.

This concludes the detailed description. The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A computer-implemented method for determining a deviation of a spread array element from a planned curved path during a towed-array marine seismic survey, comprising:

towing a seismic survey spread using a survey vessel wherein the seismic survey spread includes the spread array element associated therewith:

determining a nominal position of the spread array element at a given point in the planned curved path, wherein the planned curved path is selected from at least one of a coil path, a circular path, an ovoid path, an elliptical path, and a figure-eight path;

determining an actual position of the spread array element; and performing an error analysis based on the nominal position and the actual position; and correcting an error in the actual position of the spread array element based on the error analysis.

2. The computer-implemented method of claim 1, wherein determining the nominal position of the spread array element comprises determining the nominal position from an equipment nominal offset and a shot number.

3. The computer-implemented method of claim 1, wherein determining the nominal position of the spread array element comprises determining a distance along and a distance across.

4. The computer-implemented method of claim 1, wherein determining the actual position of the spread array element comprises determining the actual position using acoustic ranging or a Global Positioning System (GPS).

5. The computer-implemented method of claim 1, wherein performing the error analysis comprises performing the error analysis during the marine seismic survey to correct a position error for the spread array element.

6. The computer-implemented method of claim 1, wherein performing the error analysis comprises performing the error analysis after the marine seismic survey for quality control.

7. The computer-implemented method of claim 1, wherein performing the error analysis comprises performing at least one of: determining a difference between a desired position and the actual position of the spread array element; issuing one or more steering commands to one or more steering devices based on the difference; producing a plot based on the difference between a desired position and the actual position; computing one or more statistics establishing whether one or more survey specifications are being met; and displaying the plot to the user.

8. A programmed computing apparatus located on board a survey vessel comprising:

a processor located on board the survey vessel and one or more communication devices located at a seismic survey spread, the one or more communication devices being in communication with the processor:

a storage on board the survey vessel accessible by the processor;

a software component residing on the storage that, when executed by the processor, will perform a method for determining a deviation of a spread array element from a planned curved path during a towed-array marine seismic survey, wherein the planned curved path is selected from at least one of a coil path, a circular path, an ovoid path, an elliptical path, and a figure-eight path, the method comprising:

determining a nominal position of the spread array element at a given point in the planned curved path;

determining an actual position of the spread array element; and performing an error analysis based on the nominal position and the actual position; and correcting an error in the actual position of the spread array element based on the error analysis.

9. The programmed computing apparatus of claim 8, wherein determining the nominal position of the spread array element comprises determining the nominal position from an equipment nominal offset and a shot number.

10. The programmed computing apparatus of claim 8, wherein determining the nominal position of the spread array element comprises determining a distance along and a distance across.

11. The programmed computing apparatus of claim 8, wherein determining the actual position of the spread array element comprises determining the actual position using acoustic ranging or a Global Positioning System (GPS).

12. The programmed computing apparatus of claim 8, wherein performing the error analysis comprises performing the error analysis during the marine seismic survey to correct a position error for the spread array element.

13. The programmed computing apparatus of claim 8, wherein performing the error analysis comprises performing the error analysis after the marine seismic survey for quality control.

14. The programmed computing apparatus of claim 8, wherein performing the error analysis comprises performing at least one of:
  determining a difference between a desired position and the actual position of the spread array element;
  issuing one or more steering commands to one or more steering devices based on the difference;
  producing a plot based on the difference between a desired position and the actual position;
  computing one or more statistics establishing whether one or more survey specifications are being met; and
  displaying the plot to the user.

15. A method, comprising:
  towing a seismic survey spread using a survey vessel along a curved path selected from at least one of a coil path, a circular path, an ovoid path, an elliptical path, and a figure-eight path; and
  positioning a spread array element of the seismic survey spread during the traversal, comprising:
    determining a nominal position of the spread array element at a given point in the curved path;
    determining an actual position of the spread array element; performing an error analysis based on the nominal position and the actual position; and
    correcting an error in the actual position of the spread array element based on the error analysis.

16. The method of claim 15, wherein determining the nominal position of the spread array element comprises determining the nominal position from an equipment nominal offset and a shot number.

17. The method of claim 15, wherein determining the nominal position of the spread array element comprises determining a distance along and a distance across.

18. The method of claim 15, wherein determining the actual position of the spread array element comprises determining the actual position using acoustic ranging or a Global Positioning System (GPS).

19. The method of claim 15, wherein performing the error analysis comprises performing the error analysis during the seismic survey to correct a position error for the spread array element.

20. The method of claim 15, wherein performing the error analysis comprises performing the error analysis after the seismic survey for quality control.

21. The method of claim 15, wherein performing the error analysis comprises performing at least one of:
  determining a difference between a desired position and the actual position of the spread array element;
  issuing one or more steering commands to one or more steering devices based on the difference;
  producing a plot based on the difference between a desired position and the actual position;
  computing one or more statistics establishing whether one or more survey specifications are being met; and
  displaying the plot to the user.

* * * * *